Aug. 23, 1932.  J. C. NOLL  1,873,903
SLICING MACHINE
Filed June 22, 1928   2 Sheets-Sheet 1

INVENTOR.
Joseph C. Noll.
BY
ATTORNEY.

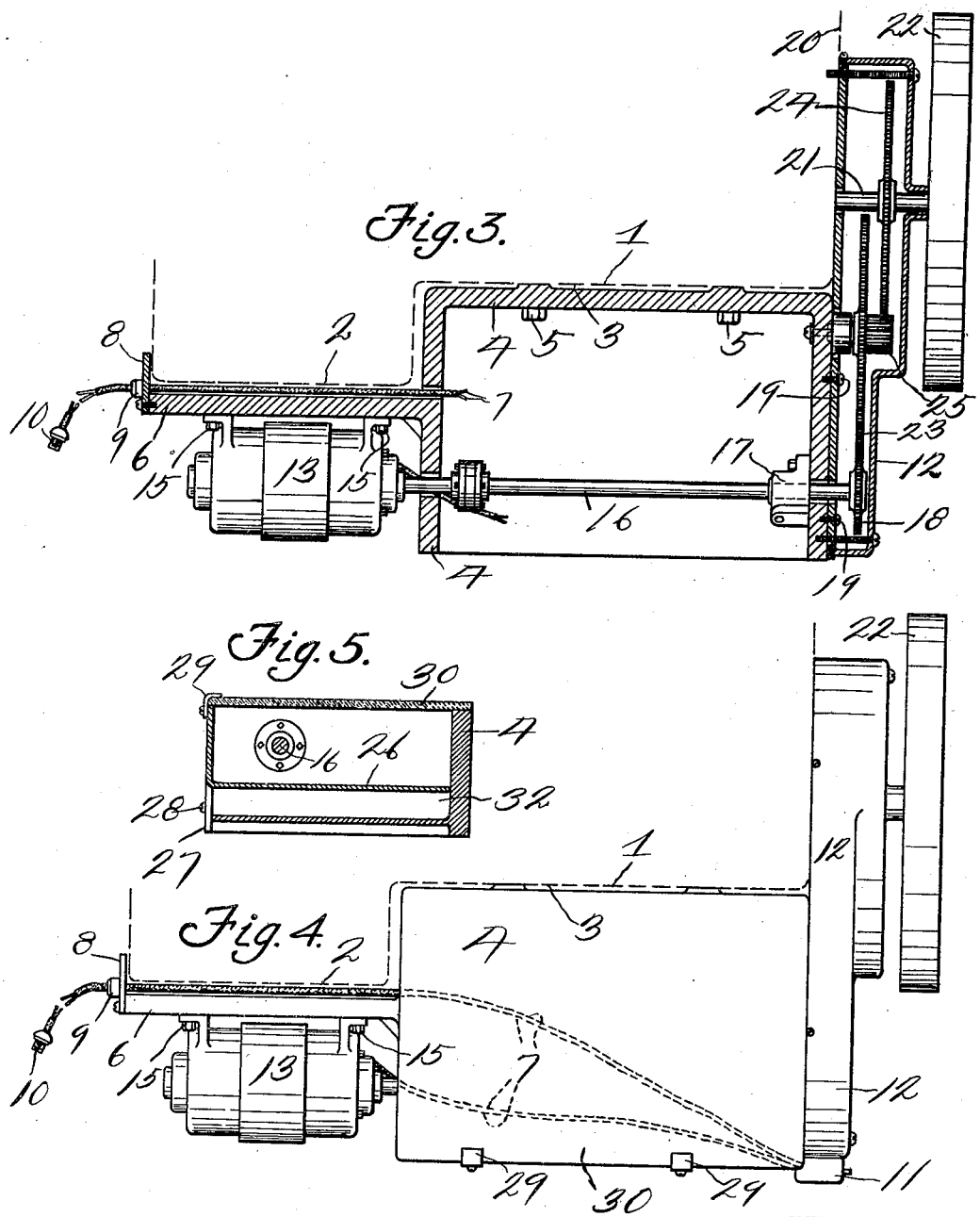

Patented Aug. 23, 1932

1,873,903

UNITED STATES PATENT OFFICE

JOSEPH C. NOLL, OF SOUTH BEND, INDIANA, ASSIGNOR, BY MESNE ASSIGNMENTS, TO GEORGE R. BLAKESLEE, OF CICERO, ILLINOIS

SLICING MACHINE

Application filed June 22, 1928. Serial No. 287,501.

The invention relates to slicing machines and has for its object to provide a power drive for a machine of this character, which drive is formed as a unit and may be easily and quickly attached to a conventional form of hand operated slicing machine, for instance of the type shown in U. S. Patent No. 1,641,180 issued to Patrick J. Lucey, Sept. 6, 1927, thereby allowing the owner of a hand operated machine to easily convert the same into a power machine by purchasing the unit, consequently obviating the necessity of buying an entirely new machine.

A further object is to provide a power unit for slicing machines comprising a base on which is mounted a motor, a drive shaft carried by the motor and rotatably mounted in bearings of the base, a gear casing carried by one end of the base and adapted to receive the drive shaft of the slicing machine and a gear train connection between the drive shaft of the motor and the drive shaft of the slicing machine.

A further object is to provide a power unit for a slicing machine having a side projection and a recess, said unit comprising a base registering with the projection and mounting a motor, an integral casing carried by said base and disposed in the recess and secured to the base of the machine, a transverse gear casing carried by one end of the base carried casing and overlying the end of the base of the machine and having a gear train connection mounted therein and connecting the drive shaft of the slicing machine and the drive shaft of the motor.

A further object is to provide the unit with an oil drip pan beneath the motor drive shaft and a wrapping paper receiving compartment below the oil pan whereby wrapping paper will be positioned on the machine, and within easy reach of the operator.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Fig. 3 is a horizontal sectional view through the power unit.

Figure 4 is a top plan view of the power unit.

Figure 5 is a vertical transverse sectional view taken on line 5—5 of Figure 1.

Figure 1:
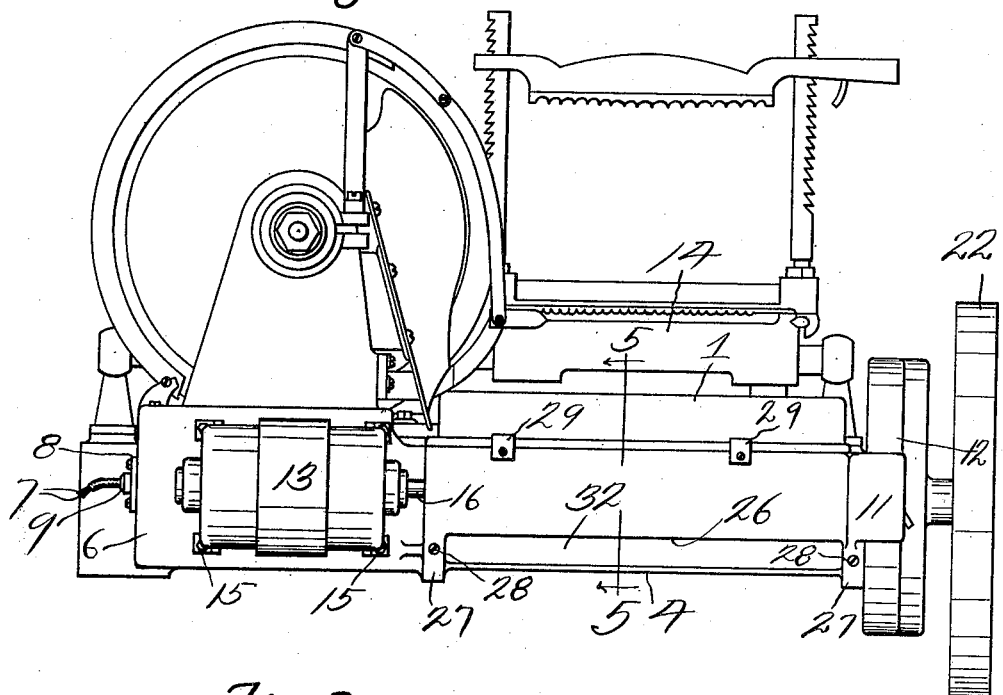
Figure 1 is a view in elevation of the slicing machine.
Figure 2:
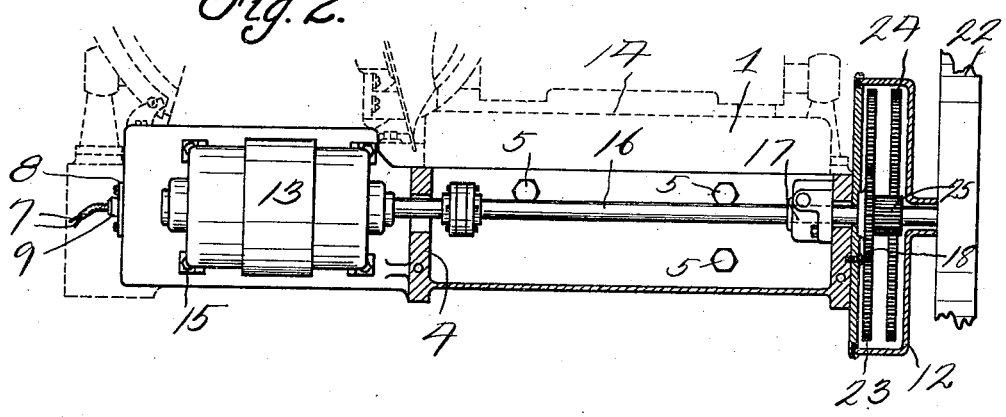
Figure 2 is a vertical longitudinal sectional view through the power unit.

Referring to the drawings, the numeral 1 designates the base of a conventional form of slicing machine, for instance the type set forth in the patent above referred to and 2 a projection extending outwardly from the front side thereof, thereby forming a recess 3. In machines of this general character, they are either power driven or hand operated, therefore when a person owns a hand operated machine and desires to change to a power machine it is necessary to discard the entire machine, and to obviate this difficulty, the power unit hereinafter set forth is designed in a manner whereby it may be easily and quickly attached to the hand operated machine and utilized for converting the machine into a power driven one. The power unit comprises a substantially rectangular shaped casing 4, disposed in the recess 3 of the base 1, and secured therein by means of bolts 5. One end of the casing 4 is provided with a base plate 6, which is in a vertical plane, and registers with the projection 2, preferably in spaced relation thereto whereby the conductor wires 7 may pass between the extension 2 and the base plate, and secured to the end of the base plate 6 is a finished plate 8, which conceals from view the space between the base plate 6 and the projection 2, and also supports an insulator 9 for the conductor wires 7, which are connected to a conventional form of plug adapted to be placed in circuit with any suitable source of power. The conductor wires 7 extend to a conventional form of switch box 11 carried by the gear casing 12 and are connected to the motor 13, therefore it will be seen that the operator may control the motor from a position adjacent the reciprocating bed 14 of the machine.

The plate 6 is formed integral with the casing 4 and secured thereto by means of the bolts 15 is the motor 13, and which motor is provided with a drive shaft 16, which extends horizontally through the casing 4, and is preferably supported in a bearing 17 within the casing 4, and terminates within the gear casing 12, and is provided with a drive gear 18. The casing 12 is secured to the end of the casing 4 by means of screws 19 and overlies the end 20 of the base 1 of the slicing machine as clearly shown in Figure 3. The casing 12 is preferably separable so that access may be had to the interior thereof, and receives therein the drive shaft 21 of the slicing machine, which is the usual standard equipment of hand operated machines and mounts thereon the fly wheel 22, standard equipment of the slicing machine. Rotatably mounted within the casing 12 is an idle gear 23, which meshes with the drive gear 18 and with a driving connection with the gear 24 carried by the drive shaft 21 of the slicing machine through a reduction gear 25 carried by the gear 23, therefore it will be seen that a gear train is provided between the shafts 16 and 21, consequently converting the hand operated machine into a power drive. It will be noted that the power drive can be vended as a single unit and to apply the same it will only be necessary to remove the fly wheel 22, place the gear 24 on the slicing machine drive shaft 21 and attach the unit. The fly wheel 21 may be replaced if desired or entirely eliminated.

The drive shaft 16 passes through the casing 4 adjacent its upper side and the casing receives therein a removable tray or pan 26 forming an oil drip pan, the opposite sides of which are provided with downwardly extending ears 27 secured to the outer side of the casing 4 by means of screws 28, therefore it will be seen that the pan is supported and may be easily removed. The pan is additionally supported by angular brackets 29, which overlie and hold the cover plate 30 in position, which cover plate may be formed from glass or other transparent material if desired. The chamber 32 formed by the bottom of the pan 26 and the bottom of the casing 4 is adapted to be used for a receptacle for wrapping paper where the paper will be within easy reach of the operator at all times, so that it can be removed for use during the slicing operation or for wrapping purposes at which time the cover 30 is utilized as a shelf.

From the above it will be seen that a power unit is provided for a meat slicing machine, which unit can be easily and quickly attached to a conventional form of meat slicing machine without varying the construction thereof, and utilized for converting a manually operated machine into a power driven one.

The invention having been set forth what is claimed as new and useful is:—

1. A power unit for a rotary slicing machine having a base provided with a recess at one side and adjacent one end thereof, said unit comprising a drive shaft extending beyond the end of the base adjacent the recess when the unit is attached to the machine, a frame adapted to be secured to the base within the recess, a plate carried by the frame and overlying a portion of the base adjacent the recess, a motor mounted on said plate, the drive shaft being driven by said motor, said drive shaft extending through the frame and beyond the end thereof, a gear train connection mounted on the end of the frame for establishing driving connection between the motor shaft and the drive shaft of the machine, and a casing carried by the end of the frame, said casing housing the drive gearing and overlying the end of the base of the machine when the unit is attached thereto.

2. In combination in a slicing machine having a base, a rotary knife adjacent one side of the base and at one end thereof, a feed table mounted for reciprocation toward and away from the knife at the inner side thereof, a drive shaft extending beyond the other end of the base, a motor mounted at the side of the base adjacent the knife and at the same end thereof as the knife, a frame at the motor side of the base between said motor and the other end of said base, a shaft driven by the motor and mounted on the frame parallel with the machine drive shaft, driving connections between the motor shaft and the machine drive shaft and located at the end of the frame remote from the motor, and a plate mounted on the frame and disposed for reception of materials sliced by the knife.

3. The combination with a slicing machine comprising a base provided with a recess at one side thereof, a rotary knife adjacent said side of the base at one end thereof, and a reciprocating feed table on the base above the recess and movable toward and from the knife, of a power unit comprising a frame secured to the base and having a portion extending into the recess, a plate carried by said portion of the frame and disposed to receive sliced material from the table, a motor mounted on the frame at one end and beyond the portion thereof which projects into the recess of the base, a drive shaft driven by the motor and extending through the frame and beneath said plate, and driving connections between the drive shaft and the machine.

4. The combination with a slicing machine comprising a base provided with a recess at one side thereof, a rotary knife adjacent said side of the base at one end thereof, and a reciprocating feed table on the base above the recess and movable toward and from the knife, of a power unit comprising a frame secured to the base and having a portion extending into the recess, a plate carried by said portion of the frame and disposed to receive sliced material from the table, a motor mounted on the frame beyond the portion thereof extending into the recess and at the end thereof adjacent the knife, a drive shaft driven by the motor and extending through the frame beneath the plate and projecting beyond the other end of the frame, and driving connections between the projecting end of the drive shaft and the machine.

In testimony whereof I affix my signature.

JOSEPH C. NOLL.